United States Patent [19]

Vaughan et al.

[11] Patent Number: 4,838,918
[45] Date of Patent: Jun. 13, 1989

[54] INERT ATMOSPHERE COOLER FOR OPTICAL FIBERS

[75] Inventors: A. Dahlgren Vaughan, Lenexa, Kans.; Dipak R. Biswas, Roanoke, Va.

[73] Assignee: Alcatel NA, Claremont, N.C.

[21] Appl. No.: 127,167

[22] Filed: Dec. 1, 1987

[51] Int. Cl.⁴ .......................................... C03B 37/027
[52] U.S. Cl. .......................................... 65/12; 65/13; 65/157; 427/163
[58] Field of Search ............... 65/12, 16, 157, 158, 65/13; 427/163; 118/65, 69

[56] References Cited

U.S. PATENT DOCUMENTS

| | | | |
|---|---|---|---|
| 4,125,387 | 11/1978 | Gunter | 65/12 |
| 4,437,870 | 3/1984 | Miller | 65/12 |
| 4,487,622 | 12/1984 | Battigelli et al. | 65/16 |
| 4,514,205 | 4/1985 | Darcangelo et al. | 65/12 |
| 4,566,890 | 1/1988 | Hostler et al. | 65/12 |
| 4,664,689 | 5/1967 | Davis | 65/12 |
| 4,673,427 | 6/1987 | Van Der Giessen et al. | 65/12 |

Primary Examiner—Robert L. Lindsay
Attorney, Agent, or Firm—Peter C. Van Der Sluys

[57] ABSTRACT

In the manufacture of optical fibers, at least a portion of a preform of optical glass is heated into a molten state and drawn to create an optical fiber of the desired diameter. To cool the fiber during the drawing process and prior to coating thereof, the invention contemplates providing a cooling device with a laminar flow of inert gas therein to surround and cool the fiber.

10 Claims, 2 Drawing Sheets

INERT ATMOSPHERE COOLER FOR OPTICAL FIBERS

BACKGROUND OF THE INVENTION

The present invention relates generally to an apparatus used in the manufacture of glass optical fiber and more particularly to a cooling apparatus for cooling glass optical fiber after it is drawn from a preform but prior to coating with appropriate coating materials.

In the process for making optical fibers used in telecommunication systems and the like, the fiber is drawn from a glass preform at elevated temperatures. Thereafter, the fiber must be cooled to approximately room temperature to permit coating thereof with appropriate polymeric coating materials, such as ultraviolet (uv) cured acrylate and silicones or thermally cured silicones, to provide protection and transmission capabilities to the coated fiber.

In order to obtain fast cooling rates for the fiber draw process and thus faster draw speeds, the boundary layer of heated air, which lies very close to the surface of the hot fiber thereby preventing efficient heat transfer, must be removed. Present coolers for fibers utilize turbulent gas flow over a short length (varying from five (5) to eighteen (18) inches) of the moving fiber. The turbulent flow of gas over the fiber surface has been shown to strip off the boundary layer of heated air, thus allowing the fiber to cool more rapidly. However, the turbulent flow of gas over the fiber surfaces causes the fiber to vibrate along its length which results in unacceptable variations in the outer diameter of the optical fiber.

Two embodiments of one known cooling device are shown in U.S. Pat. No. 4,437,870. This device utilizes a flow of dry, cooled helium gas having flow components directed along and toward the moving fiber. In the second embodiment, the helium is diffused through a porous member in an attempt to minimize the vibration of the fiber.

SUMMARY OF THE INVENTION

The present invention is designed to overcome the abovenoted limitations found in the manufacture of optical fibers, and toward this end, it contemplates the use of a laminar gas flow over the optical fiber to be cooled as the laminar gas flow does not vibrate the fiber excessively.

It is also an object of the invention to provide a cooling device capable of increasing the surface area of the fiber undergoing cooling.

Still another object is to provide such a cooling device capable of use in a high speed fiber draw process while maintaining fiber outer diameter control for the drawn and coated fiber.

A further object is to provide such a cooling device which may be readily and economically fabricated and will enjoy a long life in operation.

It has now been found that the foregoing and related objects can be readily attained in an apparatus for manufacturing glass fibers comprising a furnace having a preform of optical glass mounted therein for providing a molten supply of optical glass from which an optical fiber can be drawn. Tractor devices are provided for drawing an optical fiber from the molten supply of optical glass. The fiber so drawn is continually monitored by a device mounted adjacent to the opening of the furnace to maintain the outer diameter of optical fiber essentially consistent. A cooling device is provided for cooling the optical fiber produced by the drawing tractors The cooling device includes means for supplying an inert gas and means for directing a laminar flow of inert gas over the optical fiber produced as it travels in a path through the cooling device. Finally, an appropriate coating material is applied to the cooled fiber at a subsequent coating station.

Ideally, the means for directing the laminar flow of inert gas over the optical fiber is a pair of space parallel plates with the path of the fiber therebetween. The parallel plates can be in vertical planes and are generally cooled by circulating liquid nitrogen therethrough. The path of the fiber can be moved relative to the parallel plates to obtain different cooling rates for the fiber.

Alternatively, the cooling device can take the form of a tubular-like shell having a central core therein. The central core can be cooled by circulating liquid nitrogen therethrough.

The above devices can be used to draw and cool the glass fiber to approximately room temperature by means of a laminar flow of inert gas and subsequently coat the optical fiber to produce a coated optical fiber which exhibits a low degree of deviation in the outer diameter thereof.

The invention will be fully understood when reference is made to the following detailed description taken in conjunction with the accompanying drawings.

DETAILED DESCRIPTION OF THE INVENTION

Figure 1:
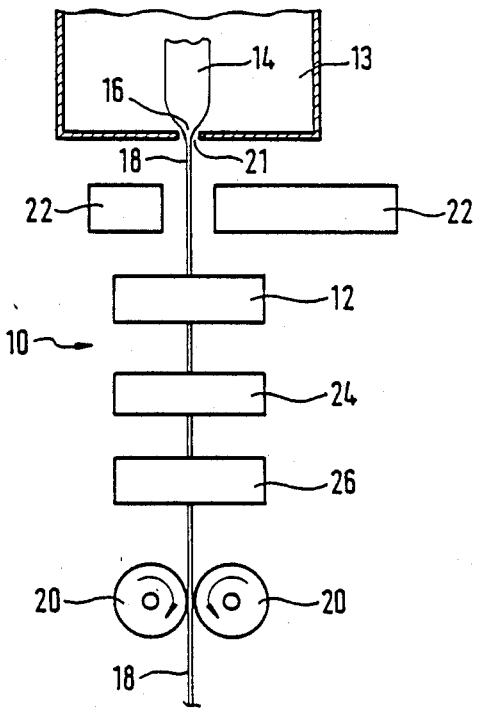
FIG. 1 is a schematic illustration in block diagram form of an optical fiber drawing system employing a fiber cooling device of the present invention.

Referring first to FIG. 1, therein illustrated is a optical fiber drawing system generally indicated by numeral 10 employing a fiber cooling device of the present invention and generally indicated by the numeral 12.

The method of fabricating optical fibers is well known and readily recognized by those skilled in the art. A furnace 13 is used to heat a solid mass of glass 14, known in the art as a preform, to a temperature of approximately 2300° C. so at least the tip 16 thereof is maintained in a molten state. An optical fiber 18 is drawn by a known procedure from the molten tip 16 of the preform 14 and engaged by two cooperating tractor devices 20 rotating in such a fashion to draw the fiber 18 from the preform form 14 in a vertical direction through an exit opening 21 of furnace 13 at a speed between one (1) meter/second and five (5) meters/second.

Adjacent the exit opening 21 in the furnace 13 is a fiber diameter monitor 22. The fiber diameter monitor 22 optically measures the outer diameter of the fiber 18 and regulates the speed of the tractor devices 20 through a control system (not shown) to maintain the diameter 18 within acceptable quality limits.

To permit coating of the fiber 18 with a suitable protective polymeric coating material such as uv-curved acrylates and silicones and thermally cured silicones, the fiber 18 must be cooled to approximately room temperature. If the fiber 18 was merely passed through the ambient air atmosphere, there would be an unreasonably long distance between the exit opening 21 of the furnace 13 and the downstream coating device 24.

To dramatically shorten the distance required to bring the fiber 18 to room temperature, the fiber 18 is passed through the cooling device 12 whose structural details and operation will be explained further hereinafter.

As the cooled fiber 18 is passed through the coating device 24, it is provided with an appropriate coating material which is dried in a dryer 26 to firmly adhere it thereto. The fiber is thereinafter rolled onto spools (not shown) for storage purposes.

Figure 2:
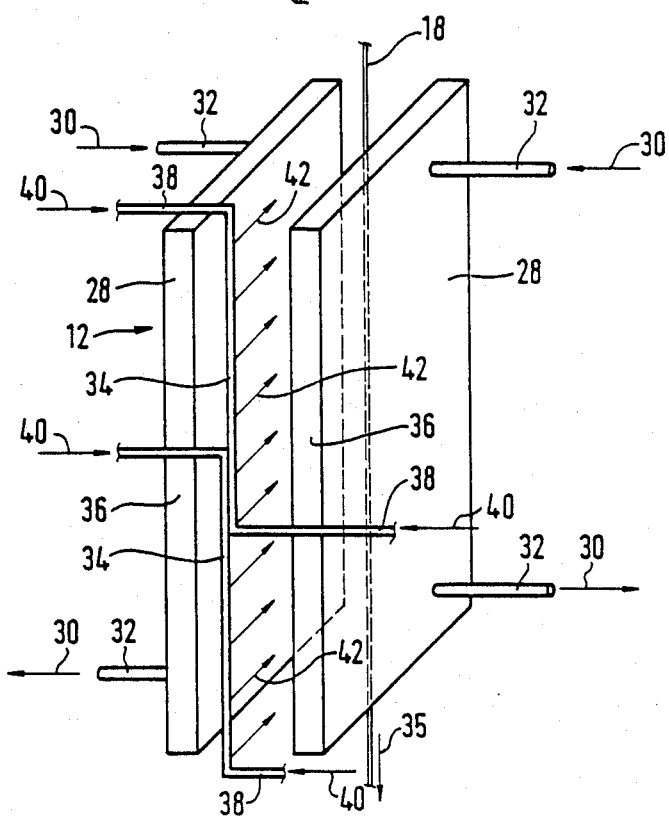
FIG. 2 is a perspective view of the fiber cooling device of the present invention.

Referring now to FIG. 2, the cooling device 12 of the present invention can be more clearly understood. The cooling device 12 comprises a pair of parallel plates 28 which are orientated in a vertical direction a spaced and equal distance from the path of the fiber 18 passing therebetween. The parallel plates 28 can take a variety of forms; for example, they can be hollow as shown in FIG. 2 and provided with liquid nitrogen as represented by arrows 30 through tubes 32 to form essentially a heat sink for absorbing heat radiating from fiber 18. Located at one end of the parallel plates 28 is a pair of vertically orientated copper tubes 34 for delivering a laminar flow of room temperature gaseous nitrogen between the parallel plates 28 to surround the fiber 18 moving downwardly in the direction of arrow 35. The tubes 34 are located in the plane formed by the forward vertical edge surfaces 36 of the parallel plates 28 and at least a portion of the tubes 34 are overlapped. The ends of the tubes 34 are provided with supply tubes 38 for delivering a supply of gaseous nitrogen indicated by arrows 40 to both ends of each of the tubes 34 and eventually to the area between the parallel plates 28 as the gaseous nitrogen flows outwardly as indicated by arrows 42 from a plurality of spaced apart holes (not shown) located in a straight row along the length of each of the tubes 34. Generally, equal amounts of nitrogen gas are supplied at both ends of the individual tubes 34 to insure uniform flow of gas through each hole in the tubes 34.

The tubes 34 are arranged so that they direct the flow of nitrogen gas along a plane centrally located between the parallel plates 28. The parallel plates 28 aid in cooling the fiber 18 by directing a consistent laminar flow of nitrogen gas across the fiber 18 as it moves therebetween.

Figure 3:
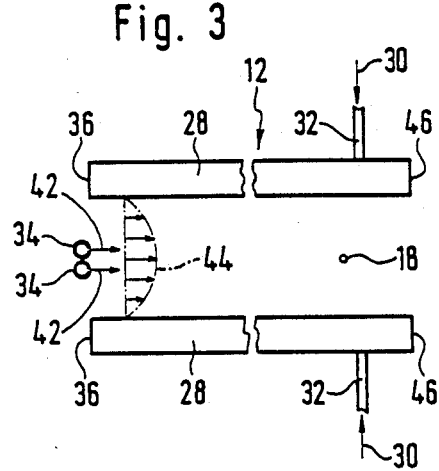
FIG. 3 is a top plan view of the fiber cooling device of the present invention illustrating its gas velocity profile.

As seen in greater detail in FIG. 3, the gas flowing within the plates 28 will develop a parabolic or semi-circular shaped gas velocity profile generally indicated by numeral 44. The path of the moving fiber 18 can be adjusted between the plates 28 to a position of least vibration of the fiber 18. It may also be adjusted closer to the tubes 34 and/or one of the plates 34 depending on the degree of cooling required. In some instances, the fiber 18 may bow as it passes between the plates 28. This phenomenon is caused by the drag of nitrogen gas over the surface of fiber 18 and has been found not to adversely affect the coating concentricity of the fiber 18.

The desired gas laminar flow pattern can be established by (1) making the length of the parallel plates 28 as long as possible, (2) keeping the distance between the plates about two inches (2") or less and (3) maintaining the distance the fiber 18 from the rear edge surfaces 46 of the plates 28 about one fourth or less of the total width of the individual plates.

As a specific example, in order to test the laminer flow theories of the present invention in a manufacturing environment, two solid, uncooled styrofoam sheets (length=seventy six inches (76"), width=eleven and five eights inches (11⅝")) were used as plates 28. Room temperature nitrogen gas was introduced between the plates 28 by the two tubes 34. Each tube being one half inch (½") copper tubing, forty eight inches (48") in length, with forty seven (47) holes having diameters of one sixteenth of an inch (1/16") and spaced one inch (1") apart in a straight line along the length of each tube. The tubes were overlapped to have a total length of seventy six inches (76"). The distance from the fiber 18 to the rear edge 46 of the plates 28 was two inches (2"), while the plates 34 were spaced two inches (2") apart and the fiber 18 was centrally located, one inch (1") from each plate 34. The cooling distance, i.e. the distance from the bottom of he furnace 13 to the coating 24 was one hundred inches (100") and the furnace temperature was 2310° C. Equal amounts of nitrogen gas were supplied at both ends of the individual tubes 34 by supply tubes 38 unless otherwise indicated in the chart below. A standard coating device with a zero percent (0%) bearing die and an uv-acrylate polymer was used as a coating material. The preform 14 used was a quartz glass rod 16 millimeters (mm) in diameter.

The following results were achieved:

| Tractor Speed | | Tube flow rates (liters/minute) | | Coating Diameter | |
|---|---|---|---|---|---|
| | | Top tube | Bottom tube | | |
| rpm | meters/ second | top end/ lower end | top end/ lower end | Nominal (micrometers) | Deviations (micrometers) |
| 247 | 1.98 | 0/0 | 20/20 | 251 | +/−3 |
| 248 | 1.98 | 0/0 | 30/30 | 252 | +/−3 |
| 248 | 1.98 | 30/0 | 30/30 | 259 | +/−2 |
| 248 | 1.98 | 40/0 | 40/40 | 261 | +/−2 |
| 285 | 2.28 | 40/0 | 40/40 | 256 | +/−3 |
| 300 | 2.40 | 40/0 | 40/40 | 253 | +/−2 |
| 307 | 2.46 | 50/0 | 50/50 | 256 | +/−2 |
| 337 | 2.70 | 50/0 | 50/50 | 250 | +/−3 |
| 373 | 2.98 | 50/0 | 50/50 | 238 | +/−4 |
| 385 | 3.08 | 50 + 1 turn/0 | 50 + 1/50 + 1 | 253 | +/−2.5 |

With the plates 34 moved closer to fiber 18, i.e. a gap of one half

| Tractor Speed | | Tube flow rates (liters/minute) | | Coating Diameter | |
|---|---|---|---|---|---|
| rpm | meters/ second | Top tube top end/ lower end | Bottom tube top end/ lower end | Nominal (micrometers) | Deviations (micrometers) |
| inch between the plates 34 or one quarter inch between each plate 34 and the fiber 18, the following results were achieved: | | | | | |
| 379 | 3.03 | 50/50 | 50/50 | 253 | +/−3 |
| 384 | 3.08 | 50/50 | 50/50 | 252 | no |
| 392 | 3.14 | 50/50 | 50/50 | 251 | values |
| 410 | 3.28 | 50/50 | 50/50 | 248 | given |
| 419 | 3.35 | 50/50 | 50/50 | 244 | +/−1.5 |

It is generally found that a deviation of ±5 micrometers is acceptable for the coating diameter and the above experimental runs clearly fell within the acceptable level. Even better results could be expected if the sheets were actively cooled by liquid nitrogen as in FIG. 2.

Figure 4:
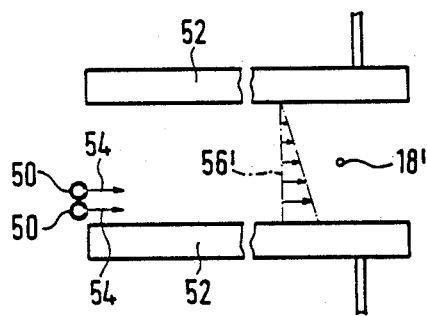
FIG. 4 is a top plan view of a second embodiment of the fiber cooling device of the present invention illustrating the gas velocity profile therein.
Figure 6:
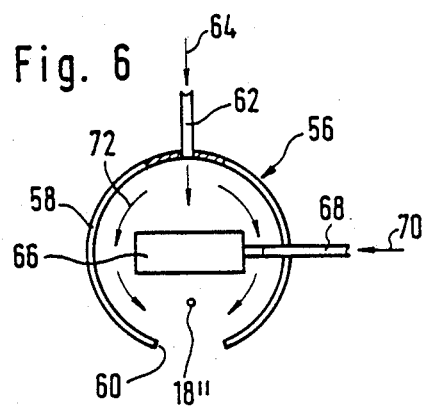
FIG. 6 is a top plan view of the FIG. 5 cooling device showing the flow pattern for the gaseous nitrogen.

In FIG. 4, there is illustrated a modified form of the cooling device of the present invention. Instead of introducing the gaseous nitrogen at the center of the parallel plates as in the embodiment of FIG. 2, the gaseous nitrogen is introduced into tubes 50, identical to tubes 34 of the first embodiment, which are adjacent to the parallel plates 52 at one end thereof and create a flow of nitrogen gas as indicated by arrow 54. This flow of nitrogen adopts a velocity profile generally indicated by numeral 56'. The exact amount of cooling to be achieved can be adjusted as it depends on the location of the path of fiber 18' relative to the velocity profile of the gas.

Figure 5:
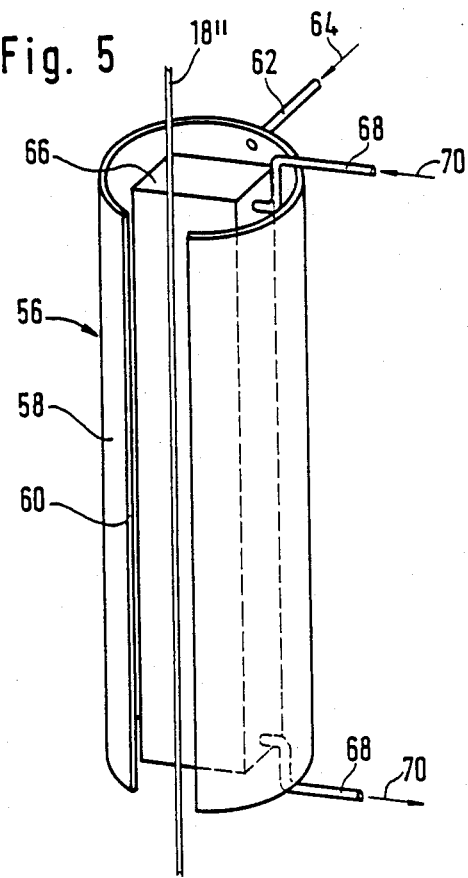
FIG. 5 is a perspective view of the third embodiment of the fiber cooling device of the present invention having a cylindrical-type shell and a cooled central core.

As seen in FIG. 5, the cooling device of the present invention can also take a cylindrical shape. The cooling device shown in FIG. 5 and generally indicated by numeral 56 is comprised of an elongated cylindrical shell 58 having a slot 60 to allow entry of the fiber 18". Located at the upper portion of the shell 58 is a tube 62 for introducing a flow of gaseous nitrogen indicated by numeral 64. Within the shell 58 is a rectangular, cooled central conduit core 66 provided with inlet and outlet tubes 68 supplying liquified nitrogen indicated by arrows 70. The core 66 acts as a heat sink for cooling the fiber 18". The inside surface of the shell 58 can be provided with flanges designed to direct the laminar flow of nitrogen gas as indicated by arrows 72.

Thus it can be seen that the present invention permits the use of a laminar flow of cooling gas over a larger surface area of the fiber thereby allowing efficient fiber cooling to take place without adversely affecting fiber diameter control as the laminar flow does not vibrate the fiber excessively.

The preferred embodiments described above admirably achieve the objects of the invention; however, it will be appreciated that departures can be made by those skilled in the art without departing from the spirit and scope of the invention which is limited only by the following claims.

Having thus described the invention, what is claimed is:

1. An apparatus for manufacturing optical glass fibers, comprising:
    means for providing a molten supply of optical glass;
    means for drawing an optical fiber from said molten supply of optical glass and along a path;
    means disposed along said path between said molten supply of optical glass and said drawing means for cooling said optical fiber produced by said means for drawing, said cooling means including means for supplying an inert gas and means for directing a laminar flow of inert gas across a length of said optical fiber to cool said optical fiber as said optical fiber travels along said path, wherein said means for directing a laminar flow of inert gas across said optical fiber includes a pair of spaced parallel plates with the path of said fiber therebetween; and
    means disposed along said path between said cooling means and said drawings means for coating said fiber with an appropriate coating material.

2. The apparatus for manufacturing optical glass fibers in accordance with claim 1, wherein said parallel plates are in parallel vertical planes.

3. The apparatus for manufacturing optical glass fibers in accordance with claim 1, additionally comprising means for cooling said parallel plates.

4. The apparatus for manufacturing optical glass fibers in accordance with claim 3, wherein said means for cooling said parallel plates comprises means for circulating liquid nitrogen through said plates.

5. The apparatus for manufacturing optical glass fibers in accordance with claim 1, additionally comprising means for selectively positioning the path of said fiber relative to said parallel plates to obtain different cooling rates for said fiber.

6. The apparatus for manufacturing optical glass fibers in accordance with claim 1, wherein said parallel plates are spaced less than two inches (2") from one another.

7. The apparatus for manufacturing optical glass fibers in accordance with claim 1, wherein said path of said fiber through said parallel plates is spaced a distance of about one-fourth or less of width of said plates form rear edge surfaces of said parallel plates.

8. An apparatus for manufacturing optical glass fibers, comprising:
    means for providing a molten supply of optical glass;
    means for drawing an optical fiber from said molten supply of optical glass and along a path;
    means disposed along said path between said molten supply of optical glass and said drawing means for cooling said optical fiber produced by said means for drawing, said cooling means including means for supplying an inert gas and means for directing a laminar flow of inert gas across a length of said optical fiber to cool said optical fiber as said optical fiber travels along said path, wherein said means for directing a laminar flow of inert gas across said optical fiber comprises a tubular-like shell having means defining a central core; and
    means disposed along said path between said cooling means and said drawings means for coating said fiber with an appropriate coating material.

9. The apparatus for manufacturing optical glass fibers in accordance with claim 8, additionally comprising means for cooling said central core.

10. The apparatus for manufacturing optical glass fibers in accordance with claim 9, wherein said means for cooling said central core comprises means for circulating liquid nitrogen therethrough.

* * * * *